United States Patent [19]

Hardcastle

[11] 4,306,742

[45] Dec. 22, 1981

[54] PIPE HANGER

[75] Inventor: Phillip Hardcastle, Houston, Tex.

[73] Assignee: Cactus Pipe & Supply Co., Inc., Houston, Tex.

[21] Appl. No.: 121,435

[22] Filed: Feb. 14, 1980

[51] Int. Cl.³ ............................................. F16L 21/00
[52] U.S. Cl. .................................. 285/147; 24/263 D
[58] Field of Search ................................ 285/144–148; 24/263 D; 166/82

[56] References Cited

U.S. PATENT DOCUMENTS

| | | | |
|---|---|---|---|
| 1,830,893 | 11/1931 | Tschapput | 285/148 |
| 2,532,662 | 12/1950 | Eckel et al. | 285/147 |
| 2,676,036 | 4/1954 | Arrowood | 285/146 |
| 2,874,436 | 2/1959 | Allen | 285/146 X |
| 2,874,437 | 2/1959 | Anderson | 285/146 X |
| 3,011,806 | 12/1961 | Allen et al. | 285/147 |
| 3,095,627 | 7/1963 | Johnson | 285/146 X |
| 3,096,554 | 7/1963 | Johnson | 285/147 X |
| 3,127,197 | 3/1964 | Kretzschmer | 285/146 X |
| 3,130,987 | 4/1964 | Johnson | 285/146 |
| 3,287,035 | 11/1966 | Greenwood | 285/147 |
| 3,329,448 | 7/1967 | Allen | 285/147 |
| 3,437,356 | 4/1969 | Todd et al. | 285/147 X |
| 3,994,517 | 11/1976 | Carmichael et al. | 285/146 |
| 4,152,015 | 5/1979 | Jones et al. | 285/146 |

*Primary Examiner*—Dave W. Arola
*Attorney, Agent, or Firm*—Pravel, Gambrell, Hewitt, Kirk, Kimball & Dodge

[57] ABSTRACT

A pipe hanger for supporting and sealing a tubular conduit in a producing well. The initial application of the tubular conduit weight to the hanger automatically actuates the seal and both sets of pipe gripping members. The upper set of pipe gripping slips initiates support of the tubular conduit and actuation of the seal and lower pipe gripping members. The lower pipe gripping members are moved radially inwardly by deformation of a resilient annular ring that is then contained within an enclosed chamber to prevent inadvertent release of the lower pipe gripping members.

3 Claims, 4 Drawing Figures

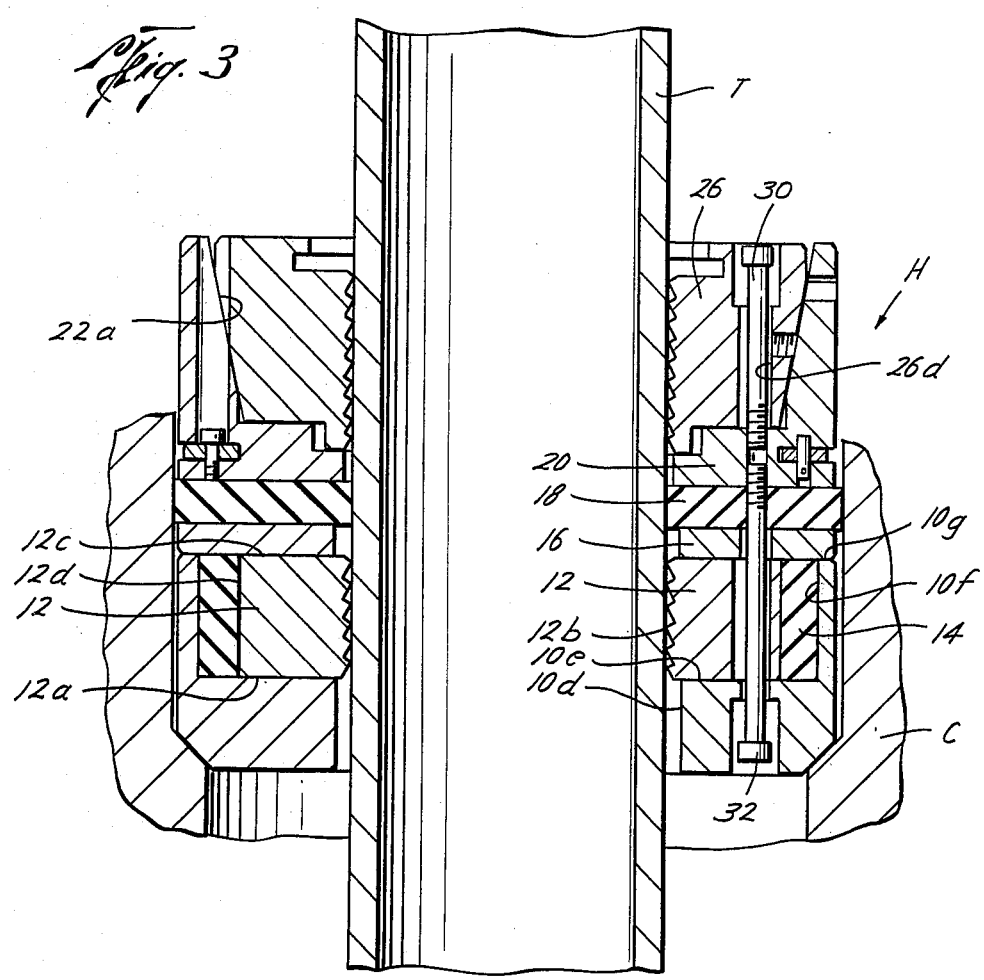
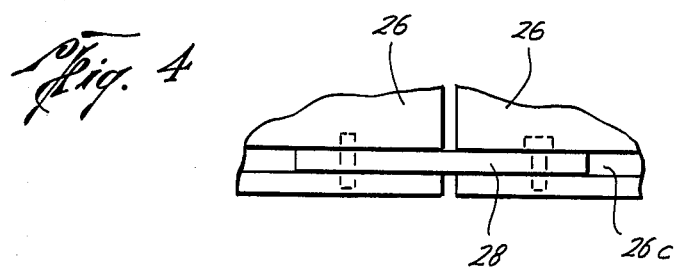

PIPE HANGER

DESCRIPTION

Technical Field

This invention relates to the field of pipe hangers for use in wells and particularly the pipe hangers which are automatically sealed when installed.

Pipe hangers are used in hydrocarbon producing wells to suspend a well conduit in the well. Usually, production tubing is suspended in the well casing by a pipe hanger that is set in the wellhead. However, other arrangements of well conduits may be supported in the well using the present invention.

Background Art

U.S. Pat. No. 2,532,662 discloses a "Well head Assembly" having a hinged arrangement to enable mounting about the production tubing. The slip bowl rests on the sealing assembly to automatically place it in compression for forming the fluid seals with both the pipe and the casing head. A single set of slips or pipe gripping elements is provided.

U.S. Pat. Nos. 2,874,436 and 2,874,437 disclose pipe hanging apparatus in which the slips are controlled to prevent collapse or reduction in diameter of the well pipe. The seal is disposed above the slips and is deformed by tightening bolt on a compression ring. See also U.S. Pat. Nos. 3,095,627; 3,096,554; and 3,130,987.

A pipe hanger and sealing unit is disclosed in U.S. Pat. No. 2,676,036. The pipe is hung from a single set of slips while the sealing unit is deformed by tightening the bolts mounting the compression ring above the slips. A similar hanger is disclosed in U.S. Pat. No. 1,830,893 to Tschappat.

A wellhead apparatus is disclosed in U.S. Pat. No. 3,127,197 in which the external seal means are replaceable under well pressure. The internal seal between the tubing and the wellhead is not replaceable without killing the well.

A "Pipe Anchor for Wellhead Assemblies" is disclosed in U.S. Pat. No. 3,994,517 in which the slips at a predetermined pipe weight loading begin to increase friction with the casing head to limit radial compression of the pipe.

The casing hanger disclosed in U.S. Pat. No. 4,152,015 employs a confined deformable packing to load each of the individual gripping elements. The pipe or conduit gripping elements rely solely upon the deformable material for the loading needed to engage and support the pipe.

U.S. Pat. No. 3,287,035 for a "Pipe Hanger" discloses the use of two sets of slips to engage the pipe. The upper set of slips moves on a tapered or sloping surface in the usual manner to initially set the slips and actuate the pipe hanger. As the movement of the initial engaging slips continues on the tapered surface, the annular seal is deformed while also urging the lower slips to move into engagement with the pipe for partially carrying the loading of the pipe with a second set of pipe engaging members. The annular seal is not confined or enclosed when the lower pipe gripping members are set. This provides a disadvantage in that subsequent movement or failure of the resilient packing element would enable the lower slips to release and thereby perhaps drop the well tubing.

DISCLOSURE OF THE INVENTION

The present invention provides an automatic set pipe hanger for supporting and sealing a well conduit in a well. Spaced upper and lower pipe gripping members support the well conduit above and below the automatically actuated resilient seal. The upper pipe gripping members are slip members that are slidably supported on a sloping surface of a slip bowl. As the slips commence to carry the weight of the tubular conduit, both the resilient seal and the lower pipe gripping members are actuated. The lower pipe gripping members are moved radially inwardly by compressive deformation of an annular ring of resilient material disposed between the pipe hanger base and the lower pipe gripping members. The resilient seal is provided with an upper compression ring carrying the slip bowl and a lower compression ring that deforms the annular ring until supported by the pipe hanger base. When the lower seal compression ring is supported by the pipe hanger base the lower actuating ring is fully confined or enclosed to insure that the lower pipe gripping members are maintained in weight supporting contact with the well conduit.

BRIEF DESCRIPTION OF THE DRAWINGS

FIG. 3 is a side view, similar to FIG. 1, with the pipe hanger apparatus in the set or installed position; and FIG. 4 is a detailed view illustrating the connection between the movable slips.

BEST MODE FOR CARRYING OUT THE INVENTION

Figure 1:
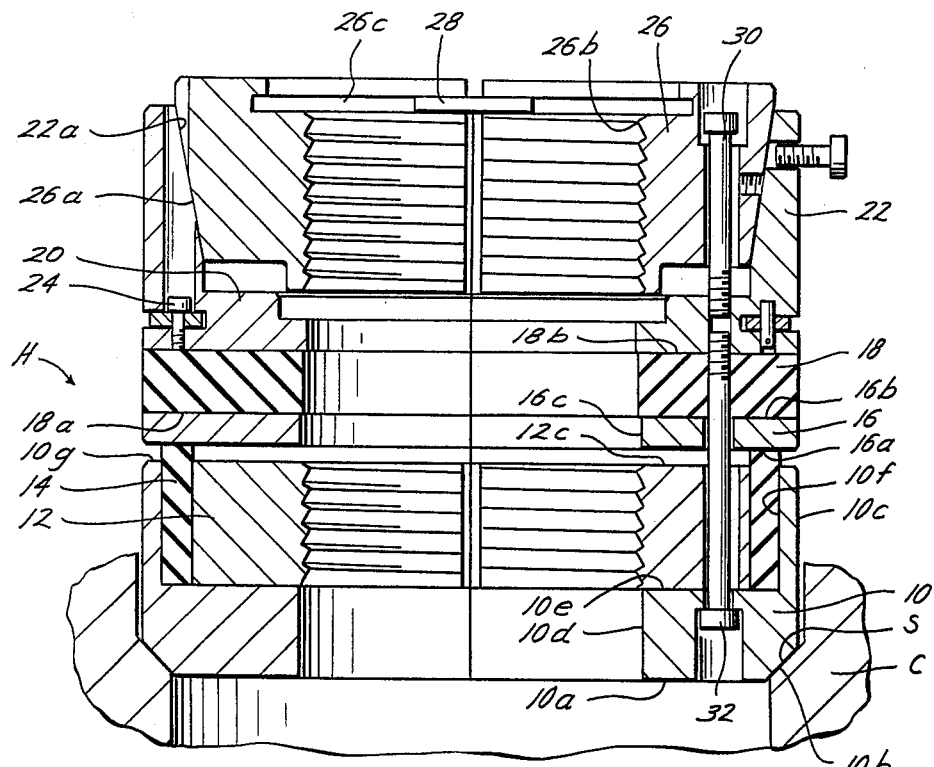
FIG. 1 is a side view in section of the pipe hanger apparatus of the present invention.

The pipe hanger assembly or apparatus, generally designated H, of the present invention is illustrated in the condition prior to installation or setting in FIG. 1. A well tubular conduit T disposed within a well casing C is supported by the pipe hanger H when installed or set as illustrated in FIG. 3. It is understood that the tubular conduit T is usually production tubing flowing hydrocarbons to the surface through the casing C, but the pipe hanger H may also be utilized to hang a different conduit in a well.

The pipe hanger H includes a lower, substantially ring-shaped base member 10 having a downwardly facing lower surface 10a provided with a tapered portion 10b adjacent the outer surface 10c. The tapered portion 10b engages the upwardly facing annular shoulder S provided by the well casing C for supporting the pipe hanger H in the well. A central opening 10d of the base member 10 is formed slightly larger in diameter than the production tubing T which extends therethrough when installed in the usual manner (FIG. 3). The inner surface 10d terminates at an upwardly facing substantially flat annular shoulder 10e which extends outwardly to upwardly facing circular surface 10f.

Movably disposed upon the surface 10e is a plurality of four segmented lower pipe gripping members 12. The pipe gripping members 12 are spaced apart (FIG. 1) and move radially inwardly on the support surface 10e to engage the adjacent segments of the production tubing T. Each of the four segments of the plurality of pipe gripping members 12 are formed identical and only one such gripping segment will be described. The segment 12 is provided with a lower substantially flat surface 12a supported on the surface 10c of the base member T for enabling the radial inward movement of the pipe gripping member 12. The inner surface 12b of the segment is provided with a plurality of pipe engaging wickers for gripping the production tubing T to support the production tubing T as is well known. The upper surface 12c of the pipe gripping member 12 is preferably formed flat or horizontal and at the same elevation as the upwardly facing shoulder 10g of the base member 10 for providing support surfaces as will be described in greater detail hereinafter. While four segments 12 have been described, a different plurality may be used. The pipe gripping member 12 has an outer circular surface 12d that is spaced from the surface 10f to form an annular cavity for receiving an annular ring of resilient material 14.

Prior to its deformation, the resilient annular ring 14 supports a seal support ring 16 in spaced relationship to the body surface 10g and the upper surface 12c of the slips 12 (FIG. 1). The seal support ring 16 is provided with a downwardly facing annular shoulder 16a contacting the annular ring 14 and an upwardly facing annular shoulder 16b. A circular inner surface 16c defines an opening in the ring 16 through which the production tubing T extends.

Mounted on the seal support ring 16 is the annular resilient seal 18 having substantially flat lower and upper surfaces 18a and 18b. The upper surface 18b engages the seal compression ring 20 which resiliently deforms the seal 18 for sealing with the casing C and the production tubing T as illustrated in FIG. 3.

Secured to the seal compression ring 20 is a slip bowl 22 that is preferably attached by a plurality of equi-circumferentially spaced bolts 24. The tubular slip bowl 22 is provided with a central opening formed by a sloping or tapered surface 22a through which the production tubing 10 extends. Mounted on the sloping surface 22a are a plurality of four slip or pipe gripping members 26 that are slidably supported thereon for gripping the production tubing T for supporting the tubing T in the well. The upper plurality of slips 26 are provided with a mating tapered surface 26a which slides along the surface 22a for moving the slips radially inwardly in response to sliding contact between the tapered surfaces 22a and 26a. Pipe engaging wickers 26b formed on each of the plurality of segments of the slips 26 enhance gripping of the tubing T. Also formed on the wicker inner surface 26b is an annular groove 26c for receiving connecting links 28 which hold the slips 26 operably together for uniform sliding movement along the surface 26a. The slips 26 are operably secured to the seal compression ring 20 by a plurality of equi-circumferentially spaced bolts 30 which extend through openings 26d formed in the slips and which enable the limited longitudinal movement of the slips 26 relative to the slip bowl 22 for effecting their operation in the usual manner.

A similar arrangement of equi-circumferentially spaced slopes 32 are used to secure the base member 10 to the seal compression ring through similar openings in the base member 10 and intermediate members 12, 16, and 18. The bolt 32 will enable the seal compression ring 20 to move downwardly toward the base member 10 for effecting deformation of the primary level 18 and the lower resilient annular ring 14 for forcing the lower pipe gripping members 12 radially inwardly.

Figure 2:
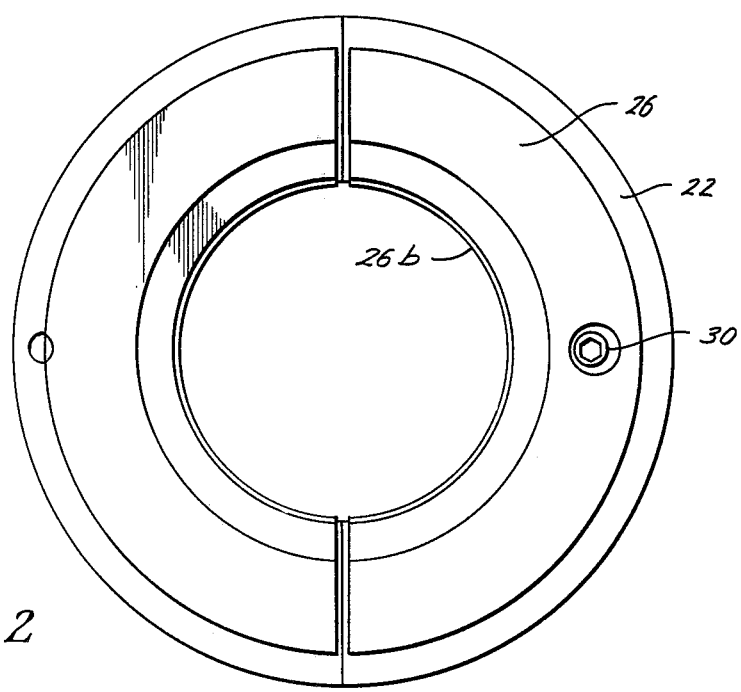
FIG. 2 is a top view of the pipe hanger apparatus.

The base 10, the seal support ring 16, and the seal compression ring 20 are split diametrically as illustrated in FIG. 2. To accomplish this pivoting motion the annular ring 14 and the primary seal 18 are split radially to permit the casing hanger H to be opened to slip around the production tubing T in the usual manner. Suitable known latch means are employed to hold the hanger H in the closed position.

Use and Operation

In the use and operation of the present invention the pipe hanger H is assembled in the extended condition illustrated in FIG. 1. When it is desired to install a hanger, the hanger is opened and placed around the production tubing T in a well known manner and placed in the casing C where the support surface 10b of the base member rests upon the annular shoulder S. The teeth 26b of the upper slips 26 are then brought into engagement with the production tubing T and the well operator will then slack off or slightly lower the production tubing T. As the weight of the production tubing T is initially supported by the teeth 26b of the slips 26, the slips 26 tend to slide down the tapered surface 22a of the slip bowl 22 for increasing the amount of weight of the production tubing T carried by the slips 26. This increasing weight is transmitted through the seal compression ring 20 to the resilient seal 18 and through the lower seal support ring 16 to the resilient annular ring 14. Deformation of the seal ring 18 will effect the desired seal between the casing C and tubing T. The deformation of the annular ring 14 forces the lower pipe gripping members 12 to move radially inwardly where the wickers 12b thereof aid in supporting the weight of the production tubing T. As the upper slips 26 continue to increase in the amount of weight of the production tubing they carry, the seal support ring 16 is forced downwardly until it engages the shoulders 10g of the base member 10 and the upper surface 12c of the lower pipe gripping members 12. The seal support ring 16 thus controls deformation of the deformable annular ring 14 for controlling the force for which the lower pipe gripping members 12 are forced radially inwardly as well as serving to enclose the annular chamber receiving the deformable annular ring 14. By enclosing the deformable annular ring 14 inadvertent disengagement of the lower pipe gripping members by flow of the deformable annular ring 14 is prevented.

When it is desired to release the production tubing T, the upper slips 26 may be moved upwardly to effect their release. Continued force on the slips 26 will effect the telescopic extension of the hanger apparatus H to the elongated position illustrated in FIG. 1 for enabling removal of the hanger H from the casing C.

The foregoing disclosure and description of the invention are illustrative and explanatory thereof and various changes in the size, shape and materials as well as in the details of the illustrated construction may be made without departing from the spirit of the invention.

I claim:
1. A pipe hanger adapted for supporting and sealing a tubular conduit in a well, including:
   a base member having a surface adapted for engagement with a wellhead, said base member having a central opening through which the tubular conduit to be supported is operably positioned;
   a plurality of tubular conduit gripping members movably supported by said base member adjacent said central opening, said tubular conduit gripping members movable radially inwardly for gripping the tubular conduit to support the tubular conduit in the well;

means supported by said base member for moving said tubular conduit gripping members radially inwardly to grip the tubular conduit;

a seal support ring disposed above said plurality of tubular conduit gripping members;

a resilient seal ring supported above said seal support ring for sealing between the tubular conduit and the wellhead when deformed;

a seal compression ring mounted above said resilient seal ring for compressing said resilient seal ring to deform for sealing between the tubular conduit and the wellhead when the weight of the tubular conduit is at least partially carried by said seal compression ring;

a tubular slip bowl supported by said seal compression ring, said slip bowl having a central opening at least partially formed by a sloping surface;

a plurality of slip members slidably supported on said sloping surface of said slip bowl for gripping the tubular conduit to support the tubular conduit in the well;

means for securing said tubular slip bowl with said seal compression ring; and means for connecting said plurality of slip members to said seal compression ring to prevent separation thereof, said means for connecting enabling movement of said plurality of slip members on said sloping surface of said slip bowl for gripping the tubular conduit.

2. A pipe hanger adapted for supporting and sealing a tubular conduit in a well, including:

a base member having a surface adapted for engagement with a wellhead to support said pipe hanger in the wellhead, said base member having a central opening through which the tubular conduit to be supported is operably positioned;

a plurality of tubular conduit gripping members movably supported by said base member adjacent said central opening, said tubular conduit gripping members movable radially inwardly for gripping the tubular conduit to support the tubular conduit in the well;

means supported by said base member for moving said tubular conduit gripping members radially inwardly to grip the tubular conduit;

a seal support ring disposed above said plurality of tubular conduit gripping members;

a resilient seal ring supported above said seal support ring for sealing between the tubular conduit and the wellhead when deformed;

a seal compression ring mounted above said resilient seal ring for compression said resilient seal ring to deform for sealing between the tubular conduit and the wellhead when the weight of the tubular conduit is at least partially carried by said seal compression ring;

a tubular slip bowl supported by said seal compression ring, said slip bowl having a central opening at least partially formed by a sloping surface;

a plurality of slip members slidably supported on said sloping surface of said slip bowl for gripping the tubular conduit to support the tubular conduit in the well;

said means for moving said plurality of tubular conduit gripping members radially inwardly including an annular ring of resilient material disposed between said base member and said plurality of tubular conduit gripping members, said annular ring of resilient material deformed by movement of said seal support ring to engage said base member for moving said tubular conduit gripping members radially inwardly and to support said seal support ring on said base member; and said base member and said plurality of tubular conduit gripping members forming an annular chamber for receiving said annular ring of resilient material, said seal support ring moving to engage said base member and said plurality of tubular conduit gripping members to deformably enclose said annular ring of resilient material in said annular chamber to prevent undesired escape of said annular ring from the annular chamber that could inadvertently release said plurality of tubular conduit gripping members.

3. The pipe hanger as set forth in claim 2, wherein:

said plurality of tubular conduit gripping members and said base member support said seal support ring to control deformation of said annular ring.

* * * * *